United States Patent
Zhang et al.

(10) Patent No.: US 10,785,750 B2
(45) Date of Patent: Sep. 22, 2020

(54) METHODS FOR TRIGGERING USER EQUIPMENT TO MONITOR PAGING MESSAGE, USER EQUIPMENTS, BASE STATIONS AND STORAGE MEDIUM

(71) Applicant: GUANGDONG OPPO MOBILE TELECOMMUNICATIONS CORP., LTD., Dongguan, Guangdong (CN)

(72) Inventors: Zhi Zhang, Guangdong (CN); Zhihua Shi, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 16/515,930

(22) Filed: Jul. 18, 2019

(65) Prior Publication Data

US 2020/0015193 A1  Jan. 9, 2020

Related U.S. Application Data

(63) Continuation of application No. PCT/CN2018/071927, filed on Jan. 9, 2018.

(60) Provisional application No. 62/448,703, filed on Jan. 20, 2017.

(51) Int. Cl.
*H04W 68/00* (2009.01)
*H04W 68/02* (2009.01)

(52) U.S. Cl.
CPC .................. *H04W 68/02* (2013.01)

(58) Field of Classification Search
USPC ............ 455/458; 370/280, 281; 450/450
See application file for complete search history.

(56) References Cited

U.S. PATENT DOCUMENTS

| | | | |
|---|---|---|---|
| 2011/0201343 A1* | 8/2011 | Pinheiro | H04W 8/22 455/450 |
| 2012/0276933 A1* | 11/2012 | Laitinen | H04W 68/025 455/458 |

(Continued)

FOREIGN PATENT DOCUMENTS

| | | |
|---|---|---|
| CN | 102769840 A | 11/2012 |
| CN | 103139880 A | 6/2013 |
| CN | 104219764 A | 12/2014 |

(Continued)

OTHER PUBLICATIONS

International Search Report (ISR) dated Mar. 27, 2018 for Application No. PCT/CN2018/071927.

(Continued)

*Primary Examiner* — David Q Nguyen
(74) *Attorney, Agent, or Firm* — Ladas & Parry LLP

(57) ABSTRACT

Methods for triggering a user equipment (UE) to monitor a paging message, user equipments, base stations, and storage medium are provided. A method for triggering a user equipment (UE) to monitor a paging message, carried out in the UE, the method comprising: acquiring a correspondence between the UE and a time-frequency resource, where a trigger message for the UE locates, of a broadcast channel; receiving the trigger message from a base station via a time-frequency resource of a broadcast channel according to the correspondence; and triggering monitoring of the paging message for the UE.

20 Claims, 7 Drawing Sheets

(56) References Cited

U.S. PATENT DOCUMENTS

2019/0104542 A1\* 4/2019 Chendamarai Kannan ................
H04W 72/046
2019/0159168 A1\* 5/2019 Wang .................... H04W 68/02

FOREIGN PATENT DOCUMENTS

| CN | 106332281 A | 1/2017 |
|---|---|---|
| WO | 2015051547 A1 | 4/2015 |

OTHER PUBLICATIONS

English translation of CN 103139880 A.
"Paging Mechanism in E-UTRAN", R2-062128 (3GPP); Mobile Competence Centre; 650, Ruote Des Lucioles; Sophia-Antipolis Cedex; France, vol. RNA WG2, No. Tallinn; Aug. 23, 2006, Aug. 23, 2006.
"Paging Procedure in LTE", R2-072709 (3GPP); Mobile Competence Centre; 650, Ruote Des Lucioles; Sophia-Antipolis Cedex; France, vol. RAN WG2, No. Orlando, USA; Jun. 22, 2007, Jun. 22, 2007 (Jun. 22, 2007).
QUALCOMM Incorporated: "WF on evaluation for wake-up signal", R1-1700821_WUS (3GPP); Mobile Competence Centre; 650, Ruote Des Lucioles; vol. RAN WG1, No. Spokane, U.S.A; Jan. 16, 2017-Jan. 20, 2017 Jan. 16, 2017 (Jan. 16, 2007), XP051208340.
The Extended European Search Report dated Oct. 31, 2019 for Application No. EP 18741585.6.
The First Office Action of corresponding Chinese application No. 201880004982.8, dated Jun. 28, 2020.
The First Office Action of corresponding European application No. 18741585.6, dated Jul. 27, 2020.

\* cited by examiner

METHODS FOR TRIGGERING USER EQUIPMENT TO MONITOR PAGING MESSAGE, USER EQUIPMENTS, BASE STATIONS AND STORAGE MEDIUM

CROSS-REFERENCE TO RELATED APPLICATIONS

The patent application is a continuation of International Application No. PCT/CN2018/071927, filed on Jan. 9, 2018, entitled "METHODS FOR TRIGGERING USER EQUIPMENT TO MONITOR PAGING MESSAGE, USER EQUIPMENTS, BASE STATIONS AND STORAGE MEDIUM", which claims the priority of the U.S. Provisional Application No. 62/448,703, entitled "A Downlink transmission method," filed on Jan. 20, 2017, the content of the two is hereby incorporated by reference herein in their entireties.

TECHNICAL FIELD

The present disclosure generally relates to the field of communications, and in particular, to methods for triggering a user equipment (UE) to monitor a paging message, UEs, base stations and storage medium.

BACKGROUND

In Long Term Evolution (LTE) system, a paging message is indicated in physical downlink control channel (PDCCH) and transmitted in physical downlink shared channel (PDSCH). A UE in an idle mode will listen to PDCCH/PDSCH according to a calculated time instance (i.e., paging occasion, abbreviated as PO), no matter there are actual paging messages or not. Because PDCCH/PDSCH is on the whole downlink bandwidth, when a UE listens PDCCH/PDSCH, some power is wasted because the paging message is only sent sometime.

The information disclosed in the background is only configured to enhance an understanding to the background of the present disclosure, and thus may include information not forming a conventional art known by those skilled in the art.

SUMMARY

In order to solve the problem in related technology, the present disclosure provides methods for triggering a UE to monitor a paging message, UEs, base stations and storage medium, which may reduce power consumption.

In a first aspect of the disclosure, there is provided a method for triggering a UE to monitor a paging message, carried out in the UE, the method including: acquiring a correspondence between the UE and a time-frequency resource, where a trigger message for the UE locates, of a broadcast channel; receiving the trigger message from a base station via a time-frequency resource of a broadcast channel according to the correspondence; and triggering monitoring of the paging message for the UE.

In a second aspect of the disclosure, there is provided a method for triggering a UE to monitor a paging message, carried out in a base station, the method including: acquiring a correspondence between the UE and a time-frequency resource, where a trigger message for the UE locates, of a broadcast channel; and sending a trigger message, which is configured for triggering monitoring of the paging message for the UE, to the UE via a time-frequency resource of a broadcast channel according to the correspondence.

In a third aspect of the disclosure, there is provided a method for triggering a UE to monitor a paging message, including: acquiring, by a base station, a correspondence between the UE and a time-frequency resource, where a trigger message for the UE locates, of a broadcast channel, the trigger message being configured for triggering monitoring of the paging message for the UE; acquiring, by the UE, the correspondence; sending, by the base station, a trigger message to the UE via a time-frequency resource of a broadcast channel according to the correspondence; receiving, by the UE, the trigger message from the base station via a time-frequency resource of a broadcast channel according to the correspondence; triggering, by the UE, monitoring of the paging message for the UE.

In a fourth aspect of the disclosure, there is provided a UE, including: a first acquisition module configured to acquire a correspondence between the UE and a time-frequency resource, where a trigger message for the UE locates, of a broadcast channel; a receiving module configured to receive the trigger message from a base station via a time-frequency resource of a broadcast channel according to the correspondence; and a triggering module configured to trigger monitoring of the paging message for the UE.

In a fifth aspect of the disclosure, there is provided a base station, including: an acquisition module configured to acquire a correspondence between the UE and a time-frequency resource, where the trigger message for the UE locates, of a broadcast channel; and a first sending module configured to send a trigger message, which is configured for triggering monitoring of the paging message for the UE, to the UE via a time-frequency resource of a broadcast channel according to the correspondence.

In a sixth aspect of the disclosure, there is provided a system including a UE of the fourth aspect and a base station of the fifth aspect.

In a seventh aspect of the disclosure, there is provided a UE, including: a processor; and a memory for storing instructions executable by the processor; wherein the processor is configured to: acquire a correspondence between the UE and a time-frequency resource, where a trigger message for the UE locates, of a broadcast channel; receive the trigger message from a base station via a time-frequency resource of a broadcast channel according to the correspondence; and trigger monitoring of the paging message for the UE.

In an eighth aspect of the present disclosure, there is provided a base station, including: a processor; and a memory for storing instructions executable by the processor; wherein the processor is configured to: acquire a correspondence between the UE and a time-frequency resource, where the trigger message for the UE locates, of a broadcast channel; and send a trigger message, which is configured for triggering monitoring of the paging message for the UE, to the UE via a time-frequency resource of a broadcast channel according to the correspondence.

In a ninth aspect of the disclosure, there is provided a non-transitory computer-readable storage medium having stored therein computer-readable instructions that, when executed by a processor of a user equipment, causes the user equipment to perform a method for triggering a UE to monitor a paging message of the first aspect.

In a tenth aspect of the disclosure, there is provided a non-transitory computer-readable storage medium having stored therein computer-readable instructions that, when executed by a processor of a base station, causes the base station to perform a method for triggering a UE to monitor a paging message of the second aspect.

The technical solutions provided by the embodiment of the present disclosure may achieve the following beneficial effects.

According to at least some embodiments of the present disclosure, before a base station sends a paging message to an UE, the base station will send a trigger message to UE. This trigger message is sent in broadcast channel with bandwidth less than the carrier bandwidth. Once a UE receives this trigger message, this UE will start to monitor downlink control and data channel. Through this mechanism, a UE needs not to monitor downlink control and data channel for a possible paging message so that power saving can be achieved.

It is to be understood that the above general descriptions and detailed descriptions below are only exemplary and explanatory and not intended to limit the present disclosure.

BRIEF DESCRIPTION OF DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Figure 1:
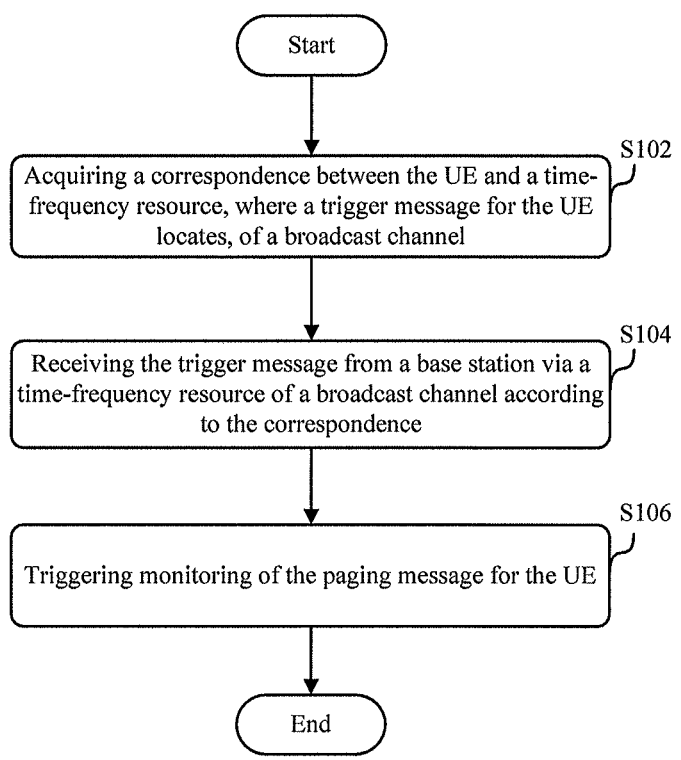
FIG. 1 is a flow chart illustrating a method for triggering a UE to monitor a paging message, carried out in the UE, according to an embodiment of the present disclosure.

Exemplary implementations will now be described more comprehensively with reference to the accompanying drawings. However, the exemplary implementations may be implemented in various forms, but should not be understood to be limited to examples elaborated herein. Instead, providing these implementations enables the present disclosure to convey the concept of the exemplary implementations to those skilled in the art more comprehensively and completely. The accompanying drawings only schematic diagrammatize the present disclosure, and may not be drawn to scale. The same accompanying drawing reference signs in the drawings represent the same or similar parts, so that repeated descriptions about them are eliminated.

In addition, the described characteristics, structures or features may be combined to one or more implementations in any proper manner. In descriptions made below, many specific details are provided for completely understanding the implementations of the present disclosure. However, those skilled in the art realize that the technical solutions of the present disclosure may be practiced with one or more of the specified details eliminated, or another method, component, device, step and the like may be adopted. Under other conditions, a known structure, method, device, implementation, material or operation is not shown or described in detail so as to avoid distraction and obscuring of each aspect of the present disclosure.

Some block diagrams shown in the accompanying drawings are functional entities, and are not required to physically or logically correspond to independent entities. These functional entities may be implemented in a software form, or these functional entities may be implemented in one or more hardware modules or integrated circuits, or these functional entities may be implemented in different networks and/or processor devices and/or microcontroller devices.

FIG. 1 is a flow chart illustrating a method for triggering a UE to monitor a paging message, carried out in the UE, according to an embodiment of the present disclosure.

As illustrated in FIG. 1, the method is carried out in a UE and the method may include the following operations.

In S102, a correspondence between the UE and a time-frequency resource, where a trigger message for the UE locates, of a broadcast channel is acquired by the UE.

In an embodiment, the correspondence may be semi-static configured. The UE may acquire an identifier of the UE from the base station. That is, the base station may assign an identifier to the UE, and may send the identifier to the UE. In an example, when the UE accesses a base station, the base station may assign an identifier to the UE and send the identifier to the UE. Accordingly, the UE may receive the identifier from the base station. In another example, the identifier may be assigned by the base station in response to a request from the UE. The UE may send a request to the base station for assigning an identifier of the UE, and then the UE may receive an identifier, assigned by the base station in response to the request, of the UE from the base station.

In case where a UE receives an identifier assigned by a base station, the UE may also acquire valid time and/or geographical area from the base station. Here, the valid time may indicate a time period during which the identifier is valid for the UE to derive the paging trigger message of the UE, and the geographical area may indicate an area, such as a tracking area (TA) or some cell, in which the identifier is valid. When the valid time has elapsed and/or the UE is outside of the valid geographical area, a base station may assign a new identifier to the UE or the UE can request a new identifier from the base station.

In case where a UE receives an identifier assigned by a base station, because the identifier is assigned by a base station, the base station may manage the UE more efficiently, and the paging trigger message may be more efficient. This also can avoid mapping multiple UEs into the same bit of the same message.

In an embodiment, the correspondence may be a correspondence between a time-frequency resource, where a trigger message for the UE locates, of a broadcast channel and one of: a unique identifier inherent to the UE, a unique identifier inherent to a subscriber of the UE, and a combination thereof. In other words, the identifier is not assigned by the base station, and instead the identifier is inherent to the UE or inherent to the subscriber of the UE. When a UE registers with a base station, the UE may report a unique identifier inherent to the UE, a unique identifier inherent to a subscriber of the UE, or a combination thereof to the base station. In an example, the unique identifier inherent to the subscriber of the UE may be an identifier inherent to the subscriber identity module (SIM) of the UE. However, the unique identifier inherent to the subscriber of the UE may be any identifier that indicates the subscriber of the UE, for example, an identifier inherent to embedded SIM (eSIM) of the UE.

The UE may acquire a correspondence between the identifier of the UE and a time-frequency resource, where a trigger message for the UE locates, of a broadcast channel from the base station. In other words, the correspondence is between the identifier of the UE and the time-frequency resource.

In an embodiment, the correspondence between the UE and a time-frequency resource, where a trigger message for the UE locates, of a broadcast channel is determined according to a first correspondence between occasion and an identifier of the UE or an identifier of a group of UEs from the base station, and a second correspondence between the occasion and a time-frequency resource of a broadcast channel from the base station.

In a related art, the UE may listen to a paging message according to a calculated instance (i.e., paging occasion). The paging occasion may be a time-frequency occasion. However, there may be no paging message sent in the paging occasion, and thus some power is wasted because paging messages are only sent sometimes.

In an embodiment of the present disclosure, however, a first correspondence between occasion and an identifier of the UE or an identifier of a group of UEs and a second correspondence between the occasion and a time-frequency resource of a broadcast channel are provided. Accordingly, the correspondence between the UE and a time-frequency resource, where a trigger message for the UE locates, of a broadcast channel is determined according to the first correspondence and the second correspondence. In other words, a UE will not listen to a paging message at the paging occasion, and instead, a UE may listen to a trigger message at a predetermined time-frequency resource that is linked to the paging occasion. When the trigger message indicates that the UE needs to be triggered, the UE will be triggered to listen to a paging message. When there is no trigger message at a predetermined time-frequency resource that is linked to the paging occasion, the UE will not be triggered to listen to a paging message. Since a trigger message is sent via a broadcast channel, which has bandwidth less than the carrier bandwidth, power may be saved.

In an embodiment, a base station may send a correspondence between the UE and a time-frequency resource, where a trigger message for the UE locates, of a broadcast channel to a UE through broadcasting, such as a system information block (SIB). Accordingly, the UE may receive the correspondence through broadcasting, such as SIB. In other words, the time and frequency resource for the potential multiple paging trigger messages can be known to UE through broadcasting, such SIB.

In S104, the UE receives the trigger message from a base station via a time-frequency resource of a broadcast channel according to the correspondence.

In an embodiment, each trigger message may be configured for triggering a UE, a group of UEs or a plurality of groups of UEs.

In case where each trigger message is configured for triggering a UE, the whole trigger message indicates which UE will be triggered for monitoring a paging message.

In case where each trigger message is configured for triggering a group of UEs, the trigger message may contain multiple bits. For example, the trigger message may contain 20 bits, and each bit corresponds to a UE. For example, a certain bit in the trigger message may indicate that a certain UE will be triggered to monitor a paging message. For example, a value "1" of a certain bit may indicate a certain UE will be triggered. In one embodiment, a value "0" of a certain bit may indicate a certain UE will be triggered.

However, it is to be understood that the bits contained in a trigger message may be more or less than 20 bits, for example, depending on the number of UEs in the cell of a base station. It is also to be understood that two or more bits may, as a whole, indicates that a certain UE will be triggered to monitor a paging message. For example, a certain pair of bits may indicate a certain UE will be triggered. For example, values "0" and "0" of a certain pair of bits may indicate a certain UE will be triggered according to a predetermine rule. In one embodiment, other values of the bits may indicate a certain UE will be triggered.

In case where each trigger message is configured for triggering a plurality of groups of UEs, the trigger message may contain multiple bits, and a certain number of bits may correspond to a group of UEs. For example, each bit may correspond to a group of UEs.

In such a case, UEs may be divided into a plurality of groups.

For example, UEs may be divided into groups according to the identifiers of the UEs. For example, when certain bit or bits of the identifier of the UEs is/are the same, the UEs will be divided into the same group, for example, by the base station, or according to a standard. In an embodiment, when a UE registers with a base station for the first time, the UE may report a unique identifier inherent to the UE, a unique identifier inherent to a subscriber of the UE, or a combination thereof to the base station. In one embodiment, the base station may assign an identifier to the UE positively or in response to a request from the UE. In some embodiments, the UEs may be divided into a plurality of groups according other predetermined rules if appropriate.

In an embodiment, a plurality of trigger messages may be carried in a time-frequency resource. In such a case, there may be multiple paging trigger messages in the pre-configured/semi-static configured time-frequency resource, and each paging trigger message may correspond to a UE, a group of UEs or a plurality of UE groups.

In case where each trigger message corresponds to a group of UE, there are for example 20 bits in each trigger message, and there are for example 3 trigger messages carried in a time-frequency resource. In such a case, UE 1-UE 20 are in paging trigger message1; UE 21-UE 40 are in paging trigger message2; and UE 41-UE 60 are in paging trigger message3. It is to be understood that there may be more or less bits than 20 bits in each trigger message, and that there may be more or less trigger messages than 3 trigger messages carried in a time-frequency resource.

In case where each trigger message corresponds to a plurality of UE groups, the trigger message may contain for example 20 bits, and each bit corresponds to for example a group of UEs. For example, a certain bit in the trigger message may indicate that a certain group of UEs will be triggered to monitor a paging message. For example, a value "1" of a certain bit may indicate a certain group of UEs will be triggered. In one embodiment, a value "0" of a certain bit may indicate a certain group of UEs will be triggered. For example, UE group 1-UE group 20 are in a first paging trigger message; UE group 21-UE group 40 are in a second paging trigger message; and UE group 41~UE group 60 are in a third paging trigger message. It is to be understood that there may be more or less bits than 20 bits in each trigger message, and that there may be more or less trigger messages than 3 trigger messages carried in a time-frequency resource.

However, it is to be understood that the bits contained in a trigger message may be more or less than 20 bits, for example, depending on the number of UEs in the cell of the base station. It is also to be understood that two or more bits may, as a whole, indicates that a certain group of UEs will be triggered to monitor a paging message. For example, a certain pair of bits may indicate a certain group of UEs will be triggered. For example, values "0" and "0" of a certain pair of bits may indicate a certain group of UEs will be triggered.

In S106, the UE triggers the monitoring of the paging message for the UE.

Once a UE reading the said message and found the UE is triggered, the UE will start to monitor PDCCH/PDSCH for actual paging message. Through this way, UE can avoid unnecessary listening to PDCCH/PDSCH, so as to achieve power saving effect.

Figure 2:
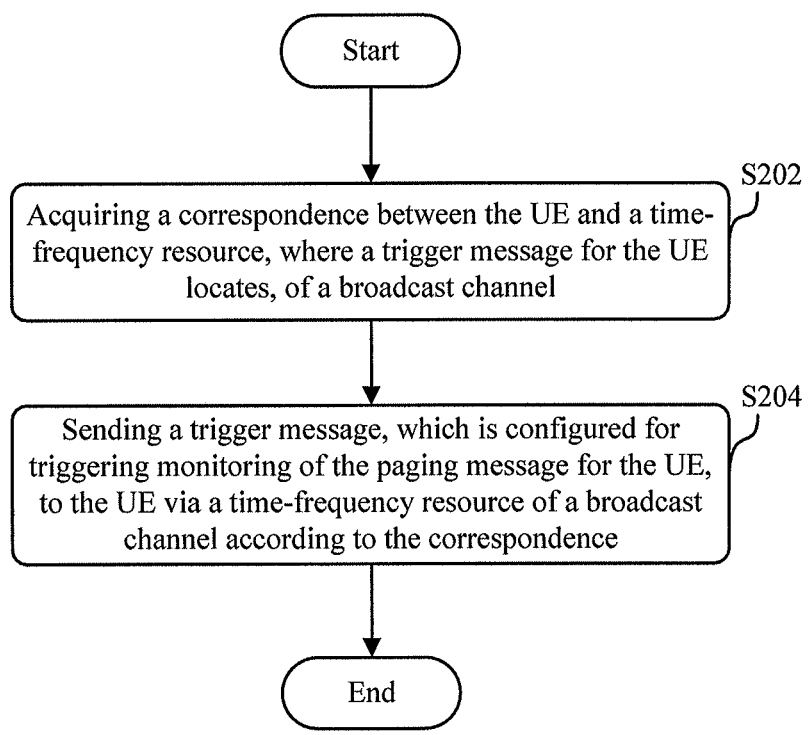
FIG. 2 is a flow chart illustrating a method for triggering a UE to monitor a paging message, carried out in a base station, according to an embodiment of the present disclosure.

FIG. 2 is a flow chart illustrating a method for triggering a UE to monitor a paging message, carried out in a base station, according to an embodiment of the present disclosure.

As illustrated in FIG. 2, the method is carried out in a base station and the method may include the following operations.

In S202, a base station acquires a correspondence between the UE and a time-frequency resource, where a trigger message for the UE locates, of a broadcast channel.

In an embodiment, the base station may acquire a pre-configured correspondence between the UE and a time-frequency resource, where a trigger message for the UE locates, of a broadcast channel. In other words, the correspondence is not configure or determined by the base station, and instead the correspondence is pre-configured or pre-determined, for example, according to a standard, or a pre-determined rule.

In an embodiment, the base station may configure a correspondence between the UE and a time-frequency resource, where a trigger message for the LIE locates, of a broadcast channel to acquire the correspondence. In other words, the base station per se configures the correspondence. In an embodiment, the method may further include sending the correspondence to the UE.

In S204, the base station sends a trigger message, which is configured for triggering monitoring of the paging message for the UE, to the UE via a time-frequency resource of a broadcast channel according to the correspondence.

In an embodiment, the method may further include assigning an identifier to the UE. In such a case, the base station may configure a correspondence between the identifier of the UE and the time-frequency resource, where a trigger message for the UE locates, of a broadcast channel. In other words, the correspondence is between an identifier and a time-frequency resource.

In an example, when a UE accesses a base station, the base station may assign an identifier to the UE. In another example, a base station may receive a request for assigning an identifier from the UE, and in response to the request, the base station may assign an identifier to the UE.

In an embodiment, the correspondence is a correspondence between a time-frequency resource, where a trigger message for the UE locates, of a broadcast channel and one of: a unique identifier inherent to the UE, a unique identifier inherent to a subscriber of the UE, and a combination thereof.

In an embodiment, a plurality of trigger messages may be carried in a time-frequency resource.

In an embodiment, each trigger message is configured for triggering, a UE, a group of UEs or a plurality of groups of UEs.

In an embodiment, the correspondence between the UE and a time-frequency resource, where a trigger message for the UE locates, of a broadcast channel is determined according to a first correspondence between occasion and an identifier of the UE or an identifier of a group of UEs from the base station, and a second correspondence between the occasion and a time-frequency resource of a broadcast channel from the base station.

The descriptions made with reference to FIG. 1 may be also applied to the method illustrated in FIG. 2, and detailed descriptions are omitted here for clarity.

Figure 3:
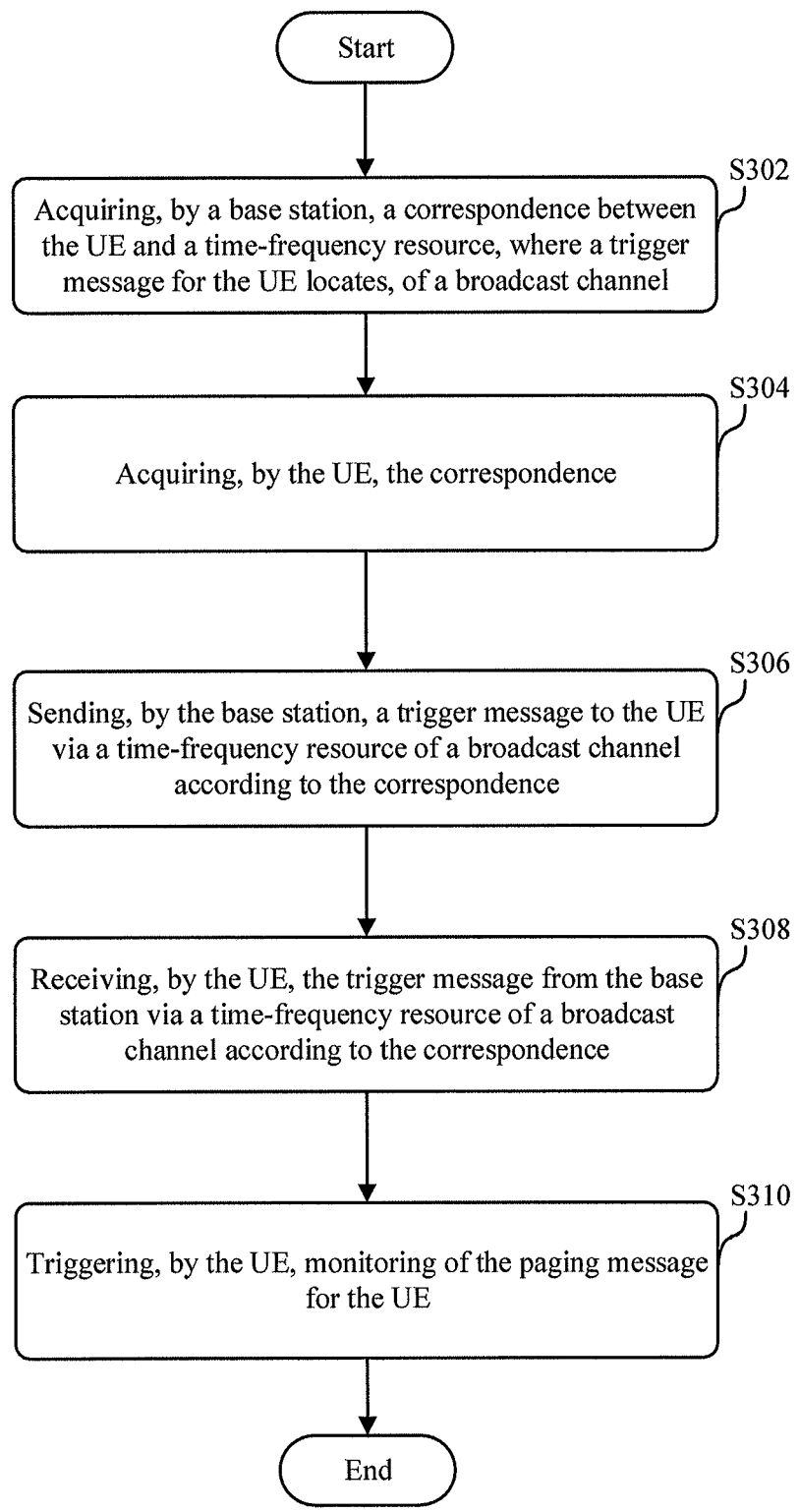
FIG. 3 is a flow chart illustrating a method for triggering a UE to monitor a paging message, carried out in the UE and a base station, according to an embodiment of the present disclosure.

FIG. 3 is a flow chart illustrating a method for triggering a UE to monitor a paging message, carried out in the UE and a base station, according to an embodiment of the present disclosure.

As illustrated in FIG. 3, the method is performed at both the UE and the base station, and the method may include the following operations.

In S302, a base station acquires a correspondence between the UE and a time-frequency resource, where a trigger message for the UE locates, of a broadcast channel, the trigger message being configured for triggering monitoring of the paging message for the UE.

In S304, the UE acquire the correspondence.

In S306, the base station sends a trigger message to the UE via a time-frequency resource of a broadcast channel according to the correspondence.

In S308, the UE receives the trigger message from the base station via a time-frequency resource of a broadcast channel according to the correspondence.

In S310, the UE triggers the monitoring of the paging message for the UE.

In an embodiment, the method may further includes assigning, by the base station, an identifier to the UE; and acquiring, by the UE, the identifier from the base station. In such a case, the correspondence is a correspondence between the identifier of the UE and a time-frequency resource, where a trigger message for the UE locates, of a broadcast channel from the base station.

In an embodiment, when a UE accesses the base station, the UE may receive an identifier, assigned by the base station, of the UE from the base station. In another embodiment, the UE may send a request to the base station for assigning an identifier of the UE, and then the UE may receive an identifier, assigned by the base station in response to the request, of the UE from the base station.

In an embodiment, the correspondence may be a correspondence between a time-frequency resource, where a trigger message for the UE locates, of a broadcast channel and one of: a unique identifier inherent to the UE, a unique identifier inherent to a subscriber of the UE, and a combination thereof.

In an embodiment, multiple trigger messages may be carried in a time-frequency resource.

In an embodiment, each trigger message may be configured for triggering a UE, a group of UEs or a plurality of groups of UEs.

In an embodiment, the correspondence between the UE and a time-frequency resource, where a trigger message for the UE locates, of a broadcast channel may be determined according to a first correspondence between occasion and an identifier of the UE or an identifier of a group of UEs from the base station, and a second correspondence between the occasion and a time-frequency resource of a broadcast channel from the base station.

The descriptions made with reference to FIG. 1 may be also applied to the method illustrated in FIG. 3, and detailed descriptions are omitted here for clarity.

Figure 4:
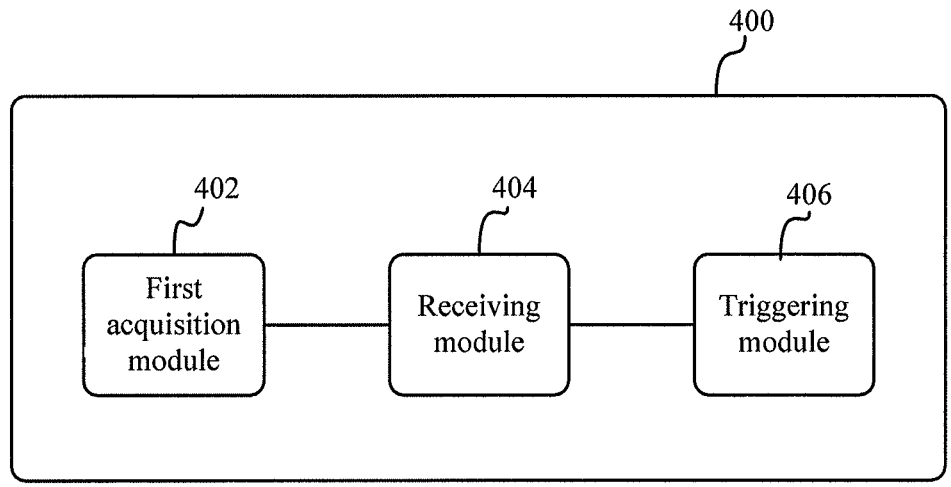
FIG. 4 is a block diagram illustrating a UE according to an embodiment of the present disclosure.

FIG. 4 is a block diagram illustrating a UE according to an embodiment of the present disclosure.

As illustrated in FIG. 4, the UE may include a first acquisition module 402, a receiving module 404, and a triggering module 406.

The first acquisition module 402 may be configured to acquire a correspondence between the UE and a time-frequency resource, where a trigger message for the UE locates, of a broadcast channel.

The receiving module 404 may be configured to receive the trigger message from a base station via a time-frequency resource of a broadcast channel according to the correspondence.

The triggering module 406 may be configured to trigger monitoring of the paging message for the UE.

Figure 5:
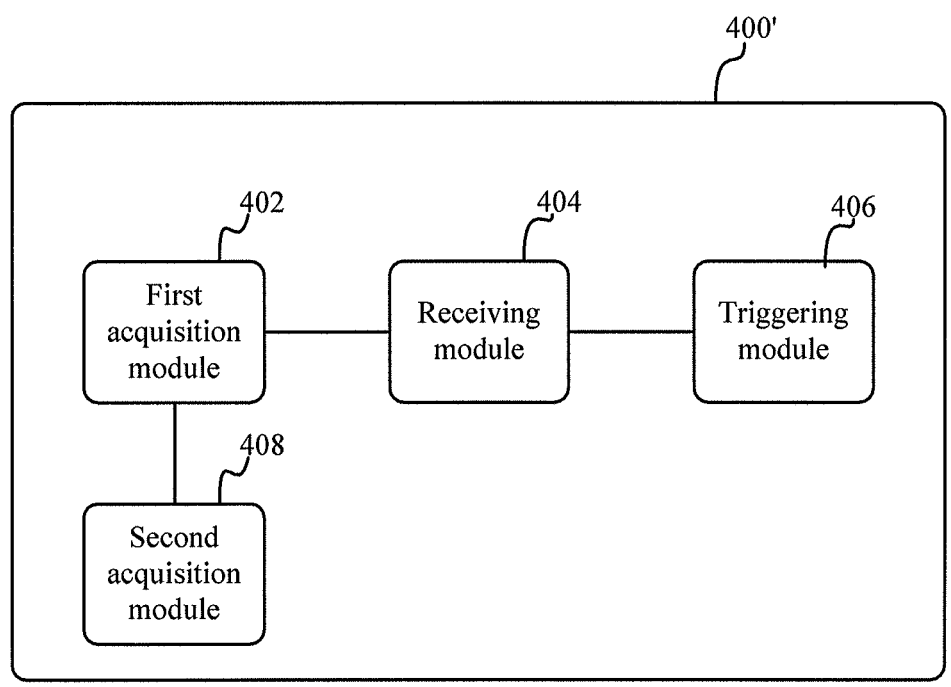
FIG. 5 is a block diagram illustrating a UE according to another embodiment of the present disclosure.

FIG. 5 is a block diagram illustrating a UE according to another embodiment of the present disclosure.

As illustrated in FIG. 5, in addition to a first acquisition module 402, a receiving module 404, and a triggering module 406, the UE include a second acquisition module 408. The second acquisition module 408 may be configured to acquire an identifier of the UE from the base station. In such a case, the first acquisition module 402 may be configured to acquire a correspondence between the identifier of the UE and a time-frequency resource, where a trigger message for the UE locates, of a broadcast channel from the base station.

In an embodiment, the second acquisition module 408 may be configured to: when the UE accesses the base station, receive an identifier, assigned by the base station, of the UE from the base station.

In another embodiment, the second acquisition module 408 may be configured to send a request to the base station for assigning an identifier of the UE, and to receive an identifier, assigned by the base station in response to the request, of the UE from the base station.

In an embodiment, the correspondence is a correspondence between a time-frequency resource, where a trigger message for the UE locates, of a broadcast channel and one of: a unique identifier inherent to the UE, a unique identifier inherent to a subscriber of the UE, and a combination thereof.

In an embodiment, multiple trigger messages are carried in a time-frequency resource.

In an embodiment, each trigger message is configured for triggering a UE, a group of UEs or a plurality of groups of UEs.

In an embodiment, the correspondence between the UE and a time-frequency resource, where a trigger message for the UE locates, of a broadcast channel is determined according to a first correspondence between occasion and an identifier of the UE or an identifier of a group of UEs from the base station, and a second correspondence between the occasion and a time-frequency resource of a broadcast channel from the base station.

The descriptions made with reference to FIGS. 1-3 may be also applied to the UE illustrated in FIGS. 4 and 5, and detailed descriptions are omitted here for clarity.

Figure 6:
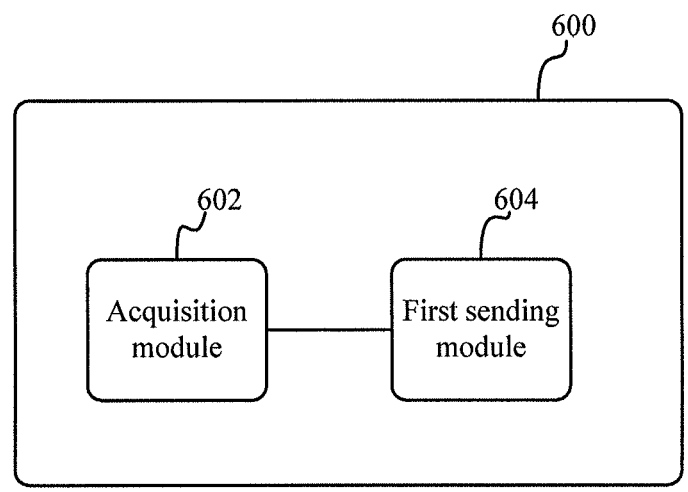
FIG. 6 is a block diagram illustrating a base station according to an embodiment of the present disclosure.

FIG. 6 is a block diagram illustrating a base station according to an embodiment of the present disclosure.

As illustrated in FIG. 6, the base station may include an acquisition module 602 and a first sending module 604.

The acquisition module 602 may be configured to acquire a correspondence between the UE and a time-frequency resource, where the trigger message for the UE locates, of a broadcast channel.

The first sending module 604 may be configured to send a trigger message, which is configured for triggering monitoring of the paging message for the UE, to the UE via a time-frequency resource of a broadcast channel according to the correspondence.

In an embodiment, the acquisition module may be configured to: acquire a pre-configured correspondence between the UE and a time-frequency resource, where the trigger message for the UE locates, of a broadcast channel.

In an embodiment, the acquisition module may be configured to configure a correspondence between the UE and a time-frequency resource, where the trigger message for the UE locates, of a broadcast channel.

Figure 7:
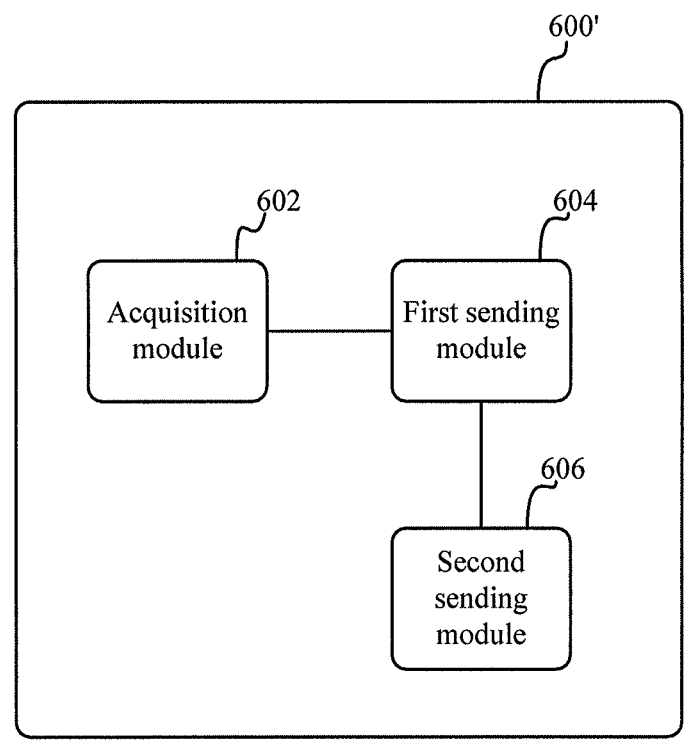
FIG. 7 is a block diagram illustrating a base station according to another embodiment of the present disclosure.

FIG. 7 is a block diagram illustrating a base station 600' according to another embodiment of the present disclosure.

As illustrated in FIG. 7, in addition to an acquisition module 602 and a first sending module 604, the base station 600' may further include a second sending module 606. The second sending module 606 may be configured to send the correspondence to the UE.

Figure 8:
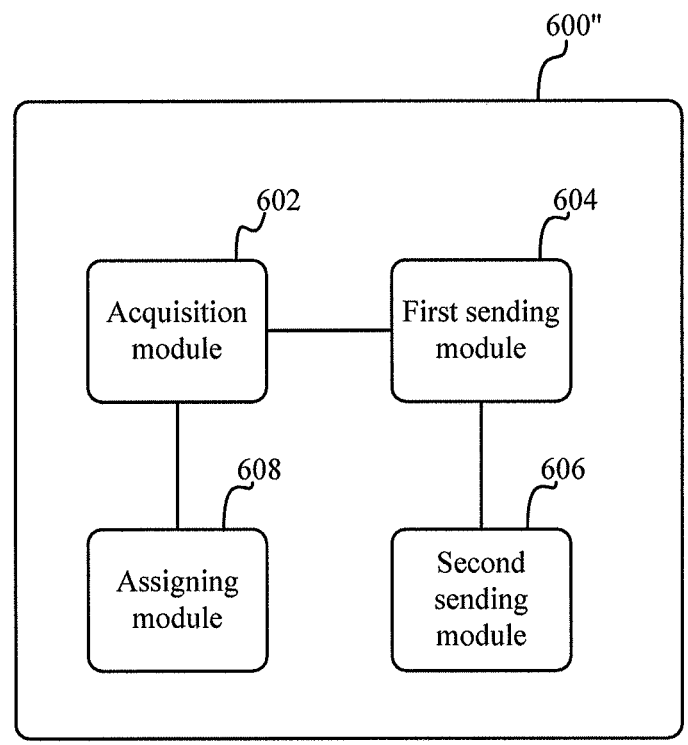
FIG. 8 is a block diagram illustrating a base station according to yet another embodiment of the present disclosure.

FIG. 8 is a block diagram illustrating a base station 600" according to yet another embodiment of the present disclosure.

As illustrated in FIG. 8, in addition to an acquisition module 602, a first sending module 604 and a second sending module 606, the base station 600" may further include an assigning module 608 configured to assign an identifier to the UE.

The assigning module 608 may be configured to: configure a correspondence between the identifier of the UE and the time-frequency resource, where the trigger message for the UE locates, of a broadcast channel.

In an embodiment, the assigning module 608 may be configured to: when the UE accesses the base station, assign an identifier to the UE.

In an embodiment, the assigning module 608 may be configured to receive a request for assigning an identifier from the UE, and in response to the request, assign an identifier to the UE.

In an embodiment, the correspondence may be a correspondence between a time-frequency resource, where a trigger message for the UE locates, of a broadcast channel and one of: a unique identifier inherent to the UE, a unique identifier inherent to a subscriber of the UE, and a combination thereof.

In an embodiment, a plurality of trigger messages may be carried in a time-frequency resource.

In an embodiment, each trigger message may be configured for triggering, a UE, a group of UEs or a plurality of groups of UEs.

The descriptions made with reference to FIGS. 1-3 may be also applied to the base station illustrated in FIGS. 6-8, and detailed descriptions are omitted here for clarity.

In an embodiment, the correspondence between the UE and a time-frequency resource, where a trigger message for the UE locates, of a broadcast channel is determined according to a first correspondence between occasion and an identifier of the UE or an identifier of a group of UEs from the base station, and a second correspondence between the occasion and a time-frequency resource of a broadcast channel from the base station.

Figure 9:
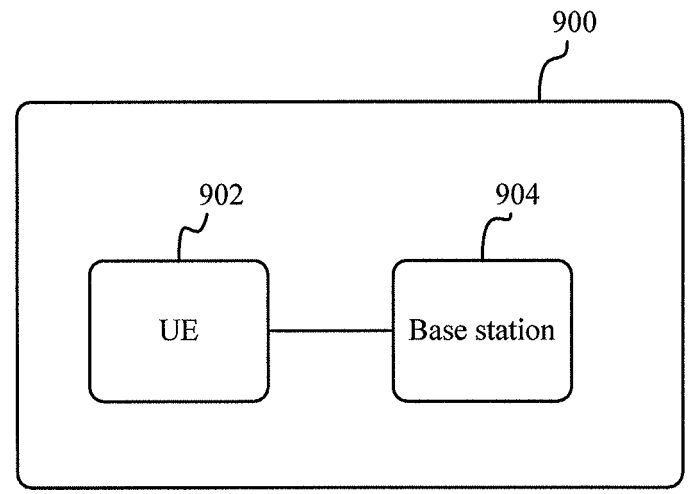
FIG. 9 is a block diagram illustrating a system including a UE and a base station according to an embodiment of the present disclosure.

FIG. 9 is a block diagram illustrating a system including a UE and a base station according to an embodiment of the present disclosure.

As illustrated in FIG. 9, the system includes a UE and a base station.

Figure 10:
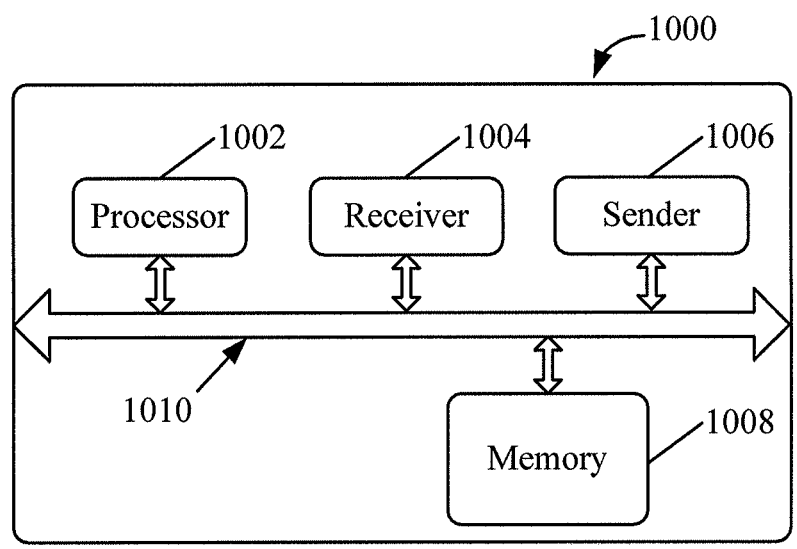
FIG. 10 is a block diagram illustrating a UE according to an embodiment of the present disclosure.

The UE may be a UE as illustrated in any one of FIG. 4, 5 or 10, or any UE that can perform the method as illustrated in FIG. 1. The base station may be a base station as illustrated in any one of FIG. 6, 7, 8 or 11, or any base station that can perform the method as illustrated in FIG. 2.

It is to be noted that the first acquisition module 402, the second acquisition module 408 and the receiving module 404 both may be implemented by a receiver, and the triggering module 406 may be implemented by a processor. As illustrated in FIG. 10, a UE 1000 may include a processor 1002, a receiver 1004, a sender 1006 and a memory 1008. Here, the memory 1008 may be configured to store instructions executed by the processor 1002 and the like.

Each component in the UE 1000 is together through a bus system 1010. Here, the bus system 1010 includes a data bus, and further includes a power bus, a control bus and a state signal bus.

The UE 400 illustrated in FIG. 4, the UE 400' illustrated in FIG. 5 or the UE 1000 illustrated in FIG. 10 may implement various processes implemented in the embodiments illustrated in FIG. 1 or FIG. 3, which will not be elaborated herein to avoid repetition.

It is to be noted that the method embodiments of the disclosure may be applied to a processor or implemented by the processor. The processor may be an integrated circuit chip with a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the methods disclosed in conjunction with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in conjunction with hardware.

It can be understood that the memory in the embodiment of the disclosure may be a volatile memory or a nonvolatile memory, or may include both the volatile and nonvolatile memories, wherein the nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be noted that, in the embodiment of the disclosure, the acquisition module 602 may be implemented by a receiver, the first sending module 604 and the second sending module 606 may be implemented by a sender, and the assigning module 608 may be implemented by a processor.

Figure 11:
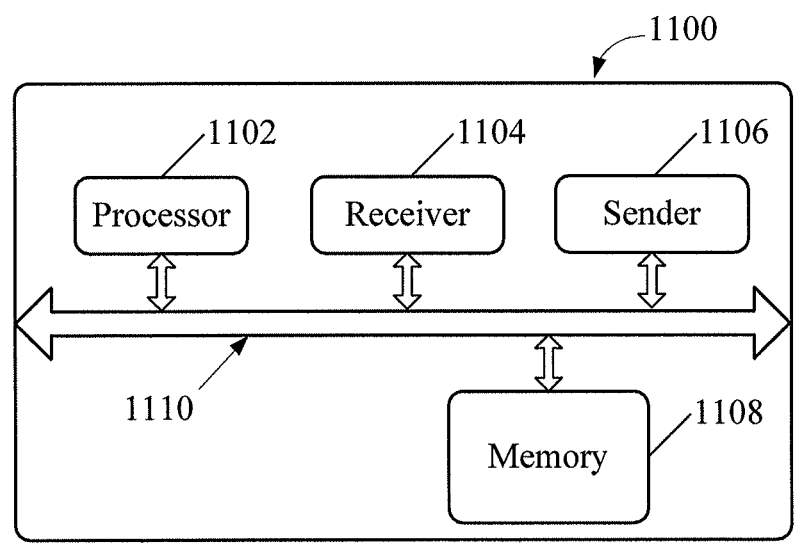
FIG. 11 is a block diagram illustrating a base station according to an embodiment of the present disclosure.

As illustrated in FIG. 11, a base station 1100 may include a processor 1102, a receiver 1104, a sender 1106 and a memory 1108. Here, the memory 1108 may be configured to store instructions executed by the processor 1102 and the like.

Each component in the base station 1100 is together through a bus system 1110. Here, the bus system 1110 includes a data bus, and further includes a power bus, a control bus and a state signal bus.

The base stations illustrated in FIGS. 6-8 or the base station 1100 illustrated in FIG. 11 may implement various processes implemented in the embodiments illustrated in FIGS. 2 and 3, which will not be elaborated herein to avoid repetition.

In an embodiment, there is provided a non-transitory computer-readable storage medium having stored therein computer-readable instructions that, when executed by a processor of a user equipment, causes the user equipment to perform a method for triggering a UE to monitor a paging message as described above.

In an embodiment, there is provided a non-transitory computer-readable storage medium having stored therein computer-readable instructions that, when executed by a processor of a base station, causes the base station to perform a method for triggering a UE to monitor a paging message as described above.

Those skilled in the art may understand that the units and algorithm steps of each example described in conjunction with the embodiments disclosed in the disclosure may be implemented by electronic hardware or a combination of computer software and the electronic hardware. Whether these functions are executed in a hardware or software manner depends on specific applications and design constraints of the technical solution. Those skilled in the art may realize the described functions for each specific application by virtue of different methods, but such realization shall fall within the scope of the disclosure.

Those skilled in the art may clearly understand that specific working processes of the system, device and unit described above may refer to the corresponding processes in the method embodiment for convenient and brief description and will not be elaborated herein.

In some embodiments provided by the disclosure, it is to be understood that the disclosed system, device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit.

When being implemented in form of software function unit and sold or used as an independent product, the function may also be stored in a computer-readable storage medium. Based on such an understanding, the technical solutions of the disclosure substantially or parts making contributions to a conventional art may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

What is claimed is:

1. A method for triggering a user equipment (UE) to monitor a paging message, the method comprising:
   acquiring, by the UE, a correspondence between the UE and a time-frequency resource of a broadcast channel, wherein the time-frequency resource of the broadcast channel has a bandwidth less than a carrier bandwidth, and is configured for sending a trigger message for the UE, and wherein there is a latency between the trigger message and the paging message in a time domain;
   receiving, by the UE, the trigger message from a base station via the time-frequency resource of the broadcast channel according to the correspondence; and
   triggering, by the UE, monitoring of the paging message for the UE in response to the trigger message.

2. The method as claimed in claim 1, further comprising:
   acquiring, by the UE, an identifier of the UE from the base station;
   wherein the acquiring, by the UE, a correspondence between the UE and a time-frequency resource of a broadcast channel comprises:
   acquiring, by the UE, a correspondence between the identifier of the UE and the time-frequency resource of the broadcast channel from the base station.

3. The method as claimed in claim 2, wherein the acquiring, by the UE an identifier of the UE from the base station comprises:
   when the UE accesses the base station, receiving, by the UE, an identifier, assigned by the base station, of the UE from the base station; or
   sending, by the UE, a request to the base station for assigning an identifier of the UE; and receiving, by the UE, an identifier, assigned by the base station in response to the request, of the UE from the base station.

4. The method as claimed in claim 1, wherein the correspondence is a correspondence between a time-frequency resource of a broadcast channel and one of: a unique identifier inherent to the UE, a unique identifier inherent to a subscriber of the UE, and a combination thereof.

5. The method as claimed in claim 1, wherein a plurality of trigger messages are carried in the time-frequency resource.

6. The method as claimed in claim 5, wherein each trigger message is configured for triggering a UE, a group of UEs or a plurality of groups of UEs, and when each trigger message is configured for triggering a plurality of groups of UEs, each bit or a pair of bits of the trigger message corresponds to a group of UEs, and each bit or a pair of bits of the trigger message are configured to indicate that a corresponding group of UEs is triggered to monitor a paging message.

7. The method as claimed in claim 1, wherein the correspondence between the UE and the time-frequency resource of the broadcast channel is determined according to a first correspondence between an occasion and an identifier of the UE or an identifier of a group of UEs from the base station, and a second correspondence between the occasion and the time-frequency resource of the broadcast channel from the base station.

8. A user equipment (UE), comprising:
   a processor;
   a memory for storing instructions executable by the processor; and
   a receiver;
   wherein
   the processor is configured to acquire a correspondence between the UE and a time-frequency resource of a broadcast channel, wherein the time-frequency resource of the broadcast channel has a bandwidth less than a carrier bandwidth, and is configured for sending a trigger message for the UE, and wherein there is a latency between the trigger message and a paging message in a time domain;
   the receiver is configured to receive the trigger message from a base station via a time-frequency resource of a broadcast channel according to the correspondence; and
   the processor is configured to trigger monitoring of the paging message for the UE in response to the trigger message.

9. The UE as claimed in claim 8, wherein the processor is configured to acquire an identifier of the UE from the base station, and acquire a correspondence between the identifier of the UE and the time-frequency resource of the broadcast channel from the base station.

10. The UE as claimed in claim 9, wherein the receiver is configured to:
when the UE accesses the base station, receive an identifier, assigned by the base station, of the UE from the base station; or
the UE further comprises: a sender,
wherein the sender is configured to send a request to the base station for assigning an identifier of the UE; and the receiver is configured to receive an identifier, assigned by the base station in response to the request, of the UE from the base station.

11. The UE as claimed in claim 8, wherein the correspondence is a correspondence between the time-frequency resource of the broadcast channel and one of: a unique identifier inherent to the UE, a unique identifier inherent to a subscriber of the UE, and a combination thereof.

12. The UE as claimed in claim 8, wherein a plurality of trigger messages are carried in the time-frequency resource.

13. The UE as claimed in claim 8, wherein each trigger message is configured for triggering a UE, a group of UEs or a plurality of groups of UEs, and when each trigger message is configured for triggering a plurality of groups of UEs, each bit or a pair of bits of the trigger message corresponds to a group of UEs, and each bit or a pair of bits of the trigger message are configured to indicate that a corresponding group of UEs is triggered to monitor a paging message.

14. The UE as claimed in claim 8, wherein the correspondence between the UE and the time-frequency resource of the broadcast channel is determined according to a first correspondence between an occasion and an identifier of the UE or an identifier of a group of UEs from the base station, and a second correspondence between the occasion and the time-frequency resource of the broadcast channel from the base station.

15. A base station, comprising:
a processor;
a memory for storing instructions executable by the processor; and
a sender;
wherein
the processor is configured to: acquire a correspondence between the UE and a time-frequency resource of a broadcast channel, wherein the time-frequency resource of the broadcast channel has a bandwidth less than a carrier bandwidth, and is configured for sending a trigger message for the UE, and wherein there is a latency between the trigger message and a paging message in a time domain; and
the sender is configured to send the trigger message to the UE via the time-frequency resource of the broadcast channel according to the correspondence, wherein the trigger message is configured for triggering the UE to monitor the paging message in response to the trigger message.

16. The base station as claimed in claim 15, wherein the processor is configured to:
acquire a pre-configured correspondence between the UE and the time-frequency resource of the broadcast channel.

17. The base station as claimed in claim 15, wherein the processor is configured to:
configure the correspondence between the UE and the time-frequency resource of the broadcast channel.

18. The base station as claimed in claim 17, wherein the sender is configured to send the correspondence to the UE.

19. The base station as claimed in claim 17, wherein the processor is configured to:
assign an identifier to the UE; and
configure a correspondence between the identifier of the UE and the time-frequency resource of the broadcast channel.

20. The base station as claimed in claim 19, wherein the processor is configured to:
when the UE accesses the base station, assign an identifier to the UE; or
the base station further comprises: a receiver,
wherein the receiver is configured to receive a request for assigning an identifier from the UE; and
the processor is configured to: in response to the request, assign an identifier to the UE.

* * * * *